(12) United States Patent
Langhoff et al.

(10) Patent No.: US 9,828,031 B2
(45) Date of Patent: Nov. 28, 2017

(54) MOTOR VEHICLE AND REAR-END MODULE THEREFOR

(71) Applicant: AUDI AG, Ingolstadt (DE)

(72) Inventors: Hans-Jürgen Langhoff, Lenting (DE); Stefan Rugies, Ingolstadt (DE); Tobias Urban, Besigheim-Ottmarsheim (DE); Dennis Decker, Benningen (DE); Sebastian Enderle, Heilbronn (DE); Pascal Schlichter, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 15/128,033

(22) PCT Filed: Mar. 6, 2015

(86) PCT No.: PCT/EP2015/000513
§ 371 (c)(1),
(2) Date: Sep. 21, 2016

(87) PCT Pub. No.: WO2015/144289
PCT Pub. Date: Oct. 1, 2015

(65) Prior Publication Data
US 2017/0217496 A1    Aug. 3, 2017

(30) Foreign Application Priority Data
Mar. 22, 2014   (DE) .................. 10 2014 004 166

(51) Int. Cl.
*B62D 21/15* (2006.01)
*B62D 21/02* (2006.01)
(Continued)

(52) U.S. Cl.
CPC .......... *B62D 21/152* (2013.01); *B60K 15/063* (2013.01); *B62D 21/02* (2013.01);
(Continued)

(58) Field of Classification Search
CPC .... B62D 21/152; B62D 25/087; B62D 25/08; B62D 43/10; B62D 25/2027; B62D 21/11;
(Continued)

(56) References Cited

U.S. PATENT DOCUMENTS 4,365,681 A * 12/1982 Singh ................. B60K 1/04
                                                      105/51
5,719,565 A    2/1998 Tsuno et al.
(Continued)

FOREIGN PATENT DOCUMENTS

CN       102530082 A    7/2012
CN       102530098      7/2012
(Continued)

OTHER PUBLICATIONS

Chinese Search Report dated Jun. 20, 2017 with respect to counterpart Chinese patent application 201580015318.X.
(Continued)

*Primary Examiner* — Glenn Dayoan
*Assistant Examiner* — Sunsurraye Westbrook
(74) *Attorney, Agent, or Firm* — Henry M. Feiereisen LLC

(57) ABSTRACT

A motor vehicle includes a body, which body has at least two rear longitudinal members each forming a primary load path for collision forces, wherein the motor vehicle has a rear-end module that can be pre-assembled as a sub-assembly, which rear-end module can be connected to the body as part of the vehicle assembly after the completion of the body-in-white and has at least a supporting structure for fastening chassis components of a rear wheel suspension and a beam structure extending from the supporting structure toward the motor-vehicle rear for absorbing collision forces, wherein the
(Continued)

supporting structure and the beam structure form at least one second load path for collision forces.

31 Claims, 5 Drawing Sheets

(51) Int. Cl.
| | |
|---|---|
| *B62D 29/00* | (2006.01) |
| *B62D 21/11* | (2006.01) |
| *B62D 25/20* | (2006.01) |
| *B62D 24/00* | (2006.01) |
| *B60K 15/063* | (2006.01) |
| *B62D 25/02* | (2006.01) |
| *B62D 27/02* | (2006.01) |

(52) U.S. Cl.
CPC .............. *B62D 21/11* (2013.01); *B62D 24/00* (2013.01); *B62D 25/025* (2013.01); *B62D 25/2027* (2013.01); *B62D 29/008* (2013.01); *B60K 2015/0638* (2013.01); *B62D 27/026* (2013.01)

(58) Field of Classification Search
CPC .......... B62D 21/15; B62D 25/02; B60K 1/04; B60K 15/063; B60K 2001/0416; B60K 2015/0474; B60K 2015/0638; B60K 13/04; B60K 15/01
USPC ... 296/187.1, 203.04, 37.2, 187.09, 30, 198, 296/204; 293/133, 102, 120, 109, 146, 293/122, 155, 134; 280/784, 781, 504, 280/834, 788, 782
See application file for complete search history.

(56) References Cited

U.S. PATENT DOCUMENTS

| | | | |
|---|---|---|---|
| 8,646,787 B2 | 2/2014 | Langhoff et al. | |
| 8,690,218 B2 | 4/2014 | Kühl et al. | |
| 8,720,980 B2 | 5/2014 | Weigel et al. | |
| 9,073,476 B2 | 7/2015 | Nikol et al. | |
| 9,120,506 B2 | 9/2015 | Isakiewitsch et al. | |
| 9,227,475 B2 | 1/2016 | Ottinger et al. | |
| 9,399,378 B2 | 7/2016 | Goldberg et al. | |
| 2002/0033594 A1* | 3/2002 | Yamamoto ............... | B60G 7/02 280/781 |
| 2003/0047932 A1 | 3/2003 | Kawazu et al. | |
| 2005/0173170 A1* | 8/2005 | Miyajima ............. | H01M 8/247 180/68.5 |
| 2006/0214414 A1 | 9/2006 | Wehner et al. | |
| 2008/0196957 A1* | 8/2008 | Koike ...................... | B60K 1/04 180/68.5 |
| 2009/0319123 A1 | 12/2009 | Nardi et al. | |
| 2010/0052368 A1 | 3/2010 | Yamaguchi et al. | |
| 2010/0066048 A1 | 3/2010 | Buschjohann et al. | |
| 2012/0175914 A1 | 7/2012 | De Luca et al. | |
| 2012/0319389 A1* | 12/2012 | Takahashi .............. | B62D 21/11 280/781 |
| 2013/0249243 A1 | 9/2013 | Lee et al. | |

FOREIGN PATENT DOCUMENTS

| | | |
|---|---|---|
| DE | 196 26 398 A1 | 1/1997 |
| DE | 102 39 500 A1 | 9/2003 |
| DE | 10 2006 040 837 A1 | 3/2008 |
| DE | 10 2008 058 152 A1 | 7/2009 |
| DE | 11 2007 002 077 T5 | 12/2009 |
| DE | 10 2010 054 693 A1 | 6/2012 |
| DE | 11 2012 216 807 A1 | 4/2013 |
| DE | 10 2012 205 967 A1 | 10/2013 |
| EP | 2 279 088 B1 | 11/2012 |
| JP | 2010-247622 A | 11/2010 |
| WO | WO 2006/114525 A1 | 11/2006 |
| WO | WO 2008/080387 | 7/2008 |

OTHER PUBLICATIONS

Translation of Chinese Search Report dated Jun. 20, 2017 with respect to counterpart Chinese patent application 201580015318.X.
International Search Report issued by the European Patent Office in International Application PCT/EP2015/000513.

* cited by examiner

MOTOR VEHICLE AND REAR-END MODULE THEREFOR

CROSS-REFERENCES TO RELATED APPLICATIONS

This application is the U.S. National Stage of International Application No. PCT/EP2015/000513, filed Mar. 6, 2015, which designated the United States and has been published as International Publication No. WO 2015/144289 and which claims the priority of German Patent Application, Serial No. 10 2014 004 166.2, filed Mar. 22, 2014, pursuant to 35 U.S.C. 119(a)-(d).

BACKGROUND OF THE INVENTION

The invention relates to a motor vehicle according to the preamble of claim 1 and a rear-end module therefore according to the preamble of claim 17.

From DE 102012205967 a support-structure assembly is known, which is provided for connection with a box-type frame of a motor vehicle, wherein individual components of the support structure have mounts for chassis components.

From DE10 2006040837 A1 it is known to directly fasten control arms of a wheel-guiding multilink arrangement with their side that faces away from the associated wheel on a chassis structure without interposition of a rear axle bracket.

SUMMARY OF THE INVENTION

From EP2114753 an axle bracket for a motor vehicle is known in which devices for receiving chassis components are configured as castings and a left casting and a right casting are connected with each other by means of a crossbeam. Such an axle bracket is screwed to the chassis by means of elastically deformable bearings, analogous to a sub-frame or rear axle bracket.

From JP2010-247622A a rear body structure is known in which an additional secondary load path is formed in the region of the reserve wheel by means of auxiliary longitudinal members provided on the raw body in combination with an auxiliary frame that is fastened to the vehicle body during mounting of the motor vehicle in addition to vehicle body longitudinal members. A disadvantage in such a configuration of the rear section of the vehicle is that the secondary load path is formed by a beam that is contributed by the body in white and by an only subsequently mounted rear axle bracket. The rear axle bracket is connected to the vehicle body by means of screw connections. This results in unwanted steps along the load path, wherein the occurring forces have to be transmitted via the screw connections. Such screw connections are provided with a large radial clearance for tolerance compensation to ensure reliable mounting of the rear axle bracket on the vehicle body. As a result it is not always ensured that in the event of a rear impact, forces are directly introduced via the secondary load path into the vehicle floor. Rather it may be the case that as a result of the sudden buildup of force in case of a collision the screw connections first have to be brought into form fitting engagement in their screw holes in order to be able to reliably transmit collision forces. This poses the risk of destruction of such screw connections and renders a reliable force transmission impossible. Furthermore a structure of the vehicle rear section configured in this manner does not provide a desired degree of flexibility, which means that potential vehicle variants that affect the vehicle-in-white have to be already realized at this raw construction state by means of controllably introduced vehicle body parts and correspondingly modified manufacturing in the construction of the body-in-white, for example a changed spot welding sequence.

In contrast thereto, the invention is based on the object to avoid the disadvantages of the state of the art and to enable a more lightweight construction of the rear-end of a vehicle and at the same time increase crash safety of the body-in-white compared to the state of the art. Another object of the invention is to reduce the logistic effort and the assembly costs during assembly of the motor vehicle and to help reduce the number of variants in the area of the vehicle body-in-white construction.

A further object of the invention is to provide a sub assembly for a rear-end of a motor vehicle that can be pre-assembled and which makes it possible to reduce the variety of body-in-white structures that would otherwise result dependent on different equipment variants of a motor vehicle such as the drive, for example front drive, rear drive or all-wheel drive, electric motor or a hybrid drive and/or.

These objects are solved with a motor vehicle with the features of the corresponding independent claim. Advantageous embodiments are set forth in the claims that depend on the independent claim that claims the rear-end module.

The last one of the objects is in particular solved by a rear-end module with the features of the corresponding independent claim. Advantageous embodiments are set forth in the claims that depend on the independent claim that claims the rear-end module.

A motor vehicle according to the invention has a vehicle body which has at least two rear longitudinal members which each form a primary load path for collision forces and are in particular part of the body-in-white. This motor vehicle is characterized according to the invention in that the motor vehicle has a rear-end module that is preassembled as sub-assembly group, and which after completion of the body-in-white can be connected with the vehicle body during vehicle assembly and has at least one support structure for fastening vehicle components of a rear wheel suspension and a beam structure which extends from the support structure toward the rear of the vehicle for absorbing collision forces, wherein the support structure and the beam structure form at least one secondary load path for collision forces, in particular for rear-side collision forces.

In an advantageous embodiment an end region of the support structure, which is situated at the front with respect to the driving direction, can be detachably connected with a second beam structure, wherein the second beam structure extends in driving direction frontwards and is particular at its front end region connectable with a floor structure of a passenger compartment of the vehicle body, so that the secondary load path is formed from the rear of the vehicle as far to the vehicle underbody.

It is also advantageous that at least one support structure and at least one beam structure is present per vehicle side which are connected with each other by means of at least one cross member.

Advantageously the rear-end module has a trough-shaped floor structure, which is configured for receiving predetermined additional aggregates, for example a gas tank, batteries or accumulators, a spare wheel, control aggregates or equipment that define vehicle variants.

The beam structure is hereby advantageously configured as a beam with a box-shaped or tubular cross section in the manner of a longitudinal member. They can also be configured as a shell-shaped open beam, in particular a shell structure for receiving and embracing a gas bottle.

The support structure advantageously has receptacles for fastening chassis components and damper elements. It has also proven advantageous to configure the support structures as extruded parts, in particular made of aluminum or an aluminum alloy. The support structure can also be configured as a welding structure made of formed steel sheets.

In order to achieve stiffening of the vehicle body it is advantageous to connect the rear-end module at least partially non-detachably with the vehicle body, for example by mans of gluing.

For connecting the rear axle drive, for example for a rear wheel or all wheel driven vehicle the rear-end module has devices for fastening the rear axle drive.

In order to satisfy modern requirements regarding rear crash safety it is recommended to arrange the secondary load path or load paths when viewed in transverse direction of the vehicle between the longitudinal members of the vehicle body, i.e., the primary load paths.

For the same purpose it is advantages to arrange the secondary load paths, in particular the beam structure, when viewed in vertical direction of the vehicle below the vehicle body longitudinal members, which form the primary load path, or to arrange them at least downwardly offset with regard to the vehicle longitudinal members.

It is advantageous to connect the support structure by means of tension or compression struts with components of the primary load path for example the longitudinal member or a side sill of the vehicle body or one or multiple floor longitudinal members on the region of the floor of a passenger compartment.

In order to be able to conduct the collision forces generated during a rear impact as directly as possible into the underbody of the vehicle via the secondary load path the rear-end module is advantageously connected rigidly with the vehicle body.

For adjusting the rear-end module to different types of vehicle equipment, the floor structure of the rear-end module is for example configured as a spare-wheel recess or a receptacle for a gas bottle or other types of equipment of the vehicle, for example control devices or accumulators.

The objects of the invention are also solved by a rear-end module for a vehicle body of a motor vehicle, wherein the rear-end module has a support structure for fastening chassis components of a rear-wheel suspension and a . . . which extends from the support structure during proper use toward the rear of the motor vehicle and which absorbs collision forces, wherein the support structure and the beam structure during proper use form at least one load path for absorbing and/or transmitting collision forces, for example caused by a rear impact.

Further advantageous embodiments of the rear vehicle module are set forth in claims 18 to 23.

BRIEF DESCRIPTION OF THE DRAWING

In the following the invention is explained in more detail by way of the drawings.

It is shown in.

DETAILED DESCRIPTION OF PREFERRED EMBODIMENTS

Figure 1:
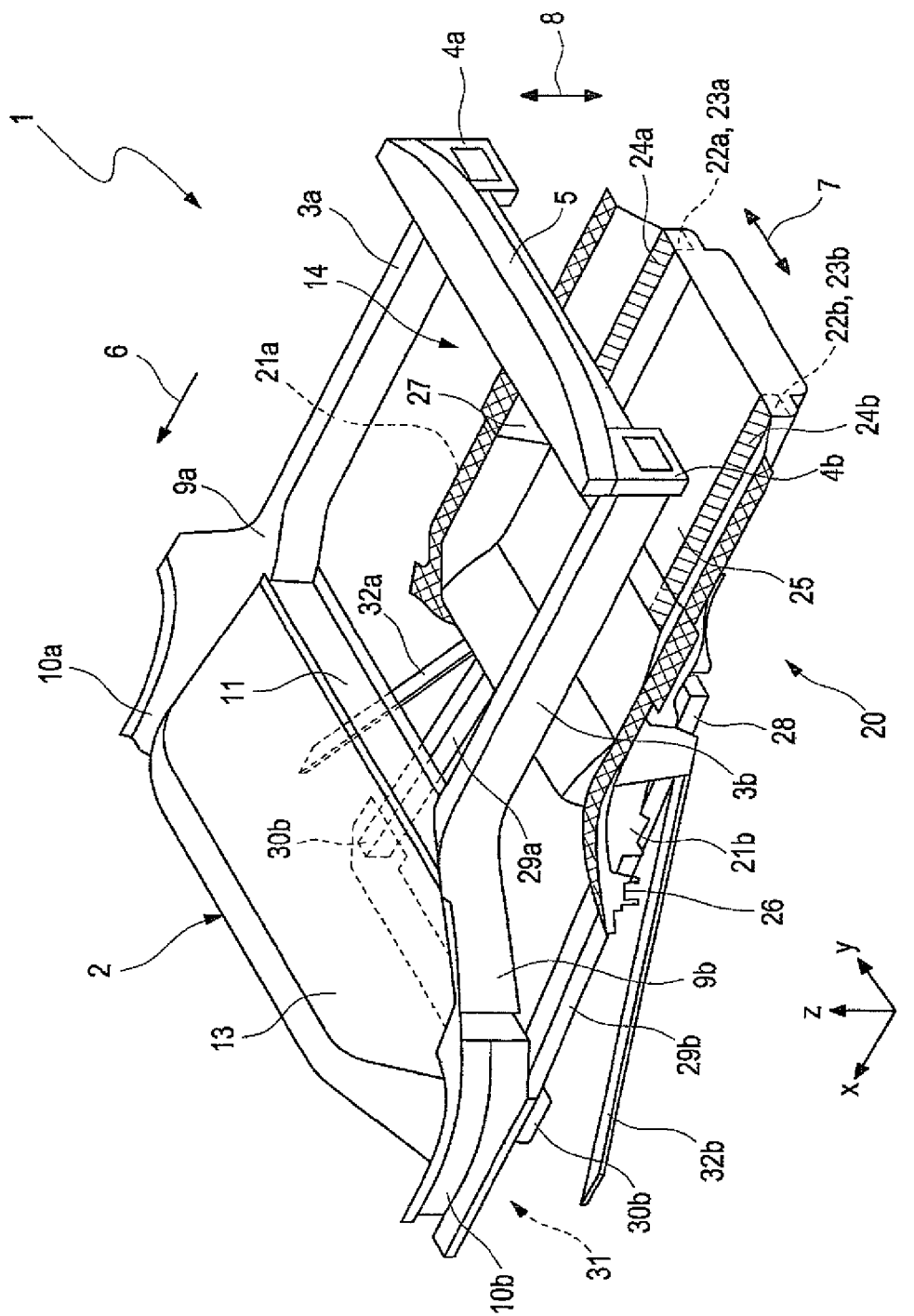
FIG. 1: a first embodiment of a rear-body structure of a motor vehicle according to the invention with a rear-end module according to the invention in a perspective exploded view.

A motor vehicle 1 according to the invention has a vehicle body 2. In FIGS. 1 to 5 only a part of the structure in particular a rear-body structure of such a vehicle body 2 is shown in the following. The vehicle body 2 has two rear longitudinal members 3a, 3b, which are a part of the body-in white. The longitudinal members 3a, 3b are for example box-shaped and each have a rear side end 4a, 4b. In the region of the rear side ends 4a, 4b the longitudinal members 3a, 3b are connected by means of a rear cross member 5.

For the following description the direction indicated by arrow 6 is the driving direction of the vehicle or the longitudinal axis of the vehicle (x-axis). The double arrow 7 indicates the transverse direction of the vehicle. The vehicle transverse direction hereby usually corresponds to a y-direction. The double arrow 8 indicates a vertical direction (z-direction) of the vehicle. At a front end with respect to the driving direction 6 the longitudinal members 3, 3b transition into side sills 10a, 10b via transition members 9a, 9b. In a transition region between the longitudinal members 3a, 3b and the transition members 9a, 9b a further cross member 11 is arranged, which connects the longitudinal members 3a, 3b and/or the transition members 9a, 9b. Viewed in driving direction 6 in front of the cross member 11 a so-called tank floor 13 is arranged below the space that is provided for example for a fuel tank. The tank floor 13 separates the vehicle body interior from the tank.

The vehicle body 2 described above, in particular the rear-body region described above, is joined during the body-in-white construction, i.e., usually from welding groups in the body-in-white construction. As can be seen from the description above such a body-in-white does not yet have any receptacles for chassis components in the region of the rear of the vehicle. Also such a rear region of the vehicle body 2 has no trunk floor structure, rather an opening 14 is provided between the longitudinal members 3a and 3b when viewed in vehicle transverse direction as well as between the rear transverse member 5 and the further transverse member 11 in vehicle longitudinal direction. This opening 14, which in vehicle body structures according to the state of the art is usually closed with a trunk floor, for example a spare wheel recess, already in the body-in-white construction, remains open in a motor vehicle 1 according to the invention in the body-in-white state.

The motor vehicle 1 according to the invention further has a rear-end module 20 which can be pre-assembled as sub assembly group. Such a rear-end module 20 has per respective vehicle side at least one support structure 21a, 21b for receiving vehicle components. The rear vehicle module 20 also has a beam structure 22a, 22b, which extends from the support structures 21a, 21b, toward the rear of the vehicle. Hereby the beam structures 22a 22b are configured box-shaped in the manner of a longitudinal member and together with the corresponding support structures 21a, 21b form at least one secondary load path for collision forces which are for example introduced into the vehicle body during a rear impact. The beam structures 22a, 22b also have a vehicle rear side end 23a, 23b. When viewed in vehicle longitudinal direction 6 the rear side ends 23a, 23b are hereby arranged at approximately the same height as the rear side ends 4a, 4b of the longitudinal members 3a, 3b. When viewed in the vehicle longitudinal direction 7 the beam structures 22a, 22b are preferably arranged inwardly relative to the longitudinal members 3a, 3b. The beam structures 22a, 22b hereby extend from the rear side end 23b parallel or almost parallel to the longitudinal members 3a, 3b in vehicle longitudinal direction 6 frontward where they lead into the support structure 23a, 23b.

The longitudinal extent of the beam structures 22a, 22b is schematically indicated by the hatchings 24a, 24b. At the end of the hatchings 24a, 24b, which is in front with respect to the driving direction 6, the beam structures 22a, 22b are connected fixedly, i.e., non-detachably, with the support structures 21a, 21b. For this purpose for example welding, gluing or the like can be used as a connection known in vehicle body construction. When viewed in transverse direction 7 of the vehicle, a respective support structure 21a and a beam structure 22a and the opposite support structure 21b and a corresponding beam structure 22b are for example connected with a trough-shaped floor segment 25.

The support structures 21a, 21b preferably have a plurality of receiving devices 26 for the fastening of chassis components. In FIG. 1 exemplary a receptacle for a transverse control arm is shown (reference numeral 26). Optionally i.e., in particular when dictated by vehicle strength requirements or other demands, the rear vehicle module 20 has one or multiple module carriers 27.

In the exemplary embodiment according to FIG. 1 the support structures 21a, 21b, the beam structures 22a, 22b, the trough-shaped floor segment 25 and the module carrier 27 form the rear-end module 20 that can be pre-assembled as a sub-assembly group. Hereby connecting surfaces (cross-hatching in FIG. 1) of the rear-end module 20 are formed for fixed connection, in particular flat connection, of the rear-end module 20 with the rear region of the vehicle body 2. Such a connection can for example be configured as gluing or a combination of screwing and gluing and is in particular configured rigid. The term rigid in this context means that notwithstanding unavoidable elasticities of the fixed connection no additional measures are taken that generate an elastic connection of the rear-end module 20 to the vehicle body 2. The goal is to generate a most stiff connection between the rear vehicle module and the vehicle body 2 in order to enable the beam structures 22a, 22b to conduct rear impact forces most directly and without damping into the vehicle body via the support structures 21a, 21b. This is aided by a large-area rigid connection for example a gluing of the rear-end module 20 to the vehicle body 2.

According to the invention multiple recesses 26 for chassis components are arranged directly on the rear-end module 20, in particular on the support structures 21, 21b, which particularly advantageously are produced as extruded components for example made of aluminum or an aluminum alloy. A separate rear axle carrier as it is usually used in the state of the art, it thus not required. On the other hand it is also possible to configure the support structures 21a, 21b as welding construction made of metal sheets, for example formed meal sheets. Advantageously the rear-end module 20 has in particular in the region of the support structures 21a, 21b a further receptacle 28 with which a second beam structure 29a, 29b can be connected with the rear-end module 20, advantageously in a detachable manner. The second beam structures 29a, 29b are hereby advantageously configured as tension struts and/or compression struts which can be connected with their front end 30a, 30b with the vehicle body 2 in the region of a floor structure 31, in particular in the region of the rear end of the sills 10a, 10b. This connection is advantageously configured detachable. The provision of the second support structures 29a, 29b makes it in particular possible to bridge the mounting space for the fuel tank on a bottom side and to directly conduct collision forces absorbed by the secondary load path into the floor structure 31 of the vehicle body 2, in particular into the passenger compartment of the vehicle body 2 or floor longitudinal members located there.

Optionally it may be advantageous, in addition to the second beam structure 29a, 29b to provide additional tension and/or compression struts 32a, 32b, which extend from the support structures 21a, 21b obliquely outwards in longitudinal direction 6 of the vehicle. The compression struts 32a, 32b can be connected to the body-in-white 2 on nodes that are located further outward when viewed in transverse direction 7 of the vehicle, for example in the region of a sill 10a, 10b.

A particular advantage of the invention is that the entire rear-end module composed of at least the support structures 21a, 21b, the beam structures 22a, 22b and optionally one or multiple module carriers 27 and a floor structure 25 can be produced as a sub-assembly group that can be produced independent of the vehicle body construction and can be mounted during vehicle assembly to the rear-end module 20 can hereby for example be adjusted to different requirements of the motor vehicle 1, for example by adjusting the design of the floor segment 25. Thus it is for example possible to configure the floor segment 25 as spare wheel recess. In addition other applications may be realized, for example recesses for control devices, accumulators, gas bottles or other tanks can be provided. A rear-end module 20 according to the invention can thus be used to provide a multitude of vehicle variants which according to the state of the art would have to be realized by means of controlled sheet metal parts or controlled sheet metal part sequences as assembly solution. The body-in-white construction and the complicated logistic associated therewith is thus simplified. The rear-end module 20 can be produced separately and so as to be adapted to the vehicle, for example as assembly group that can be provided by suppliers and in a "standardized" body-in-white construction in one assembly step. At the same time the rear-end module 20 according to the invention also makes it possible to form a secondary load path which in the completely assembled motor vehicle 1 can be arranged in addition to the primary load paths consisting of the body-in-white longitudinal members 3a, 3b, the transition members 9a, 9b and the side sills 10a, 10b. Thus the rear-end module 20 according to the invention not only represents an assembly group but enables intentionally influencing vehicle body stiffness and crash properties of the vehicle rear by accordingly configuring the rear-end module 20. In particular as a result of the possibility to connect the rear-end module with the body in white in a flat manner a significant improvement of the overall vehicle body stiffness can be achieved.

Hereby it is particularly advantageous that the beam structures 22a, 22b of the rear-end module 20 directly interact with the support structures 21a, 21b by which compared to the state of the art, in which for example a rear axle carrier is screwed to a secondary load path structure, a significantly improved transmission of collision forces is achieved.

In the exemplary embodiments explained in connection with FIGS. 2 to 5 the rear-end module 20 is shown in the assembled state relative to the vehicle body 2. In FIG. 1 on the other hand the rear-end module 20 is lowered in vehicle vertical direction 8 in the manner of an exploded view.

Figure 2:
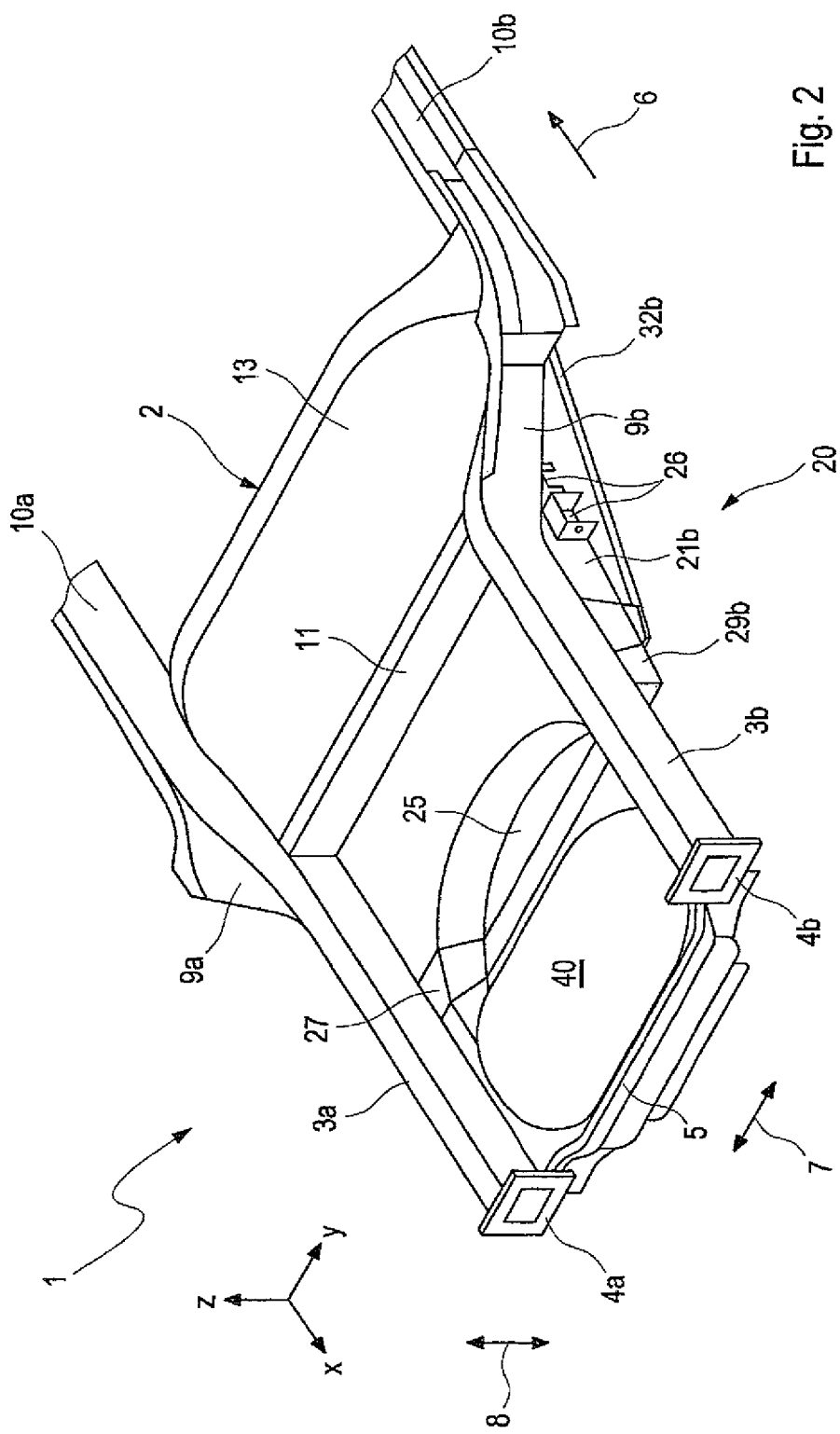
FIG. 2: a perspective to view onto a second embodiment of a rear-body structure of a motor vehicle according to the invention including a second embodiment of the rear-end module according to the invention in the assembled state.
Figure 3:
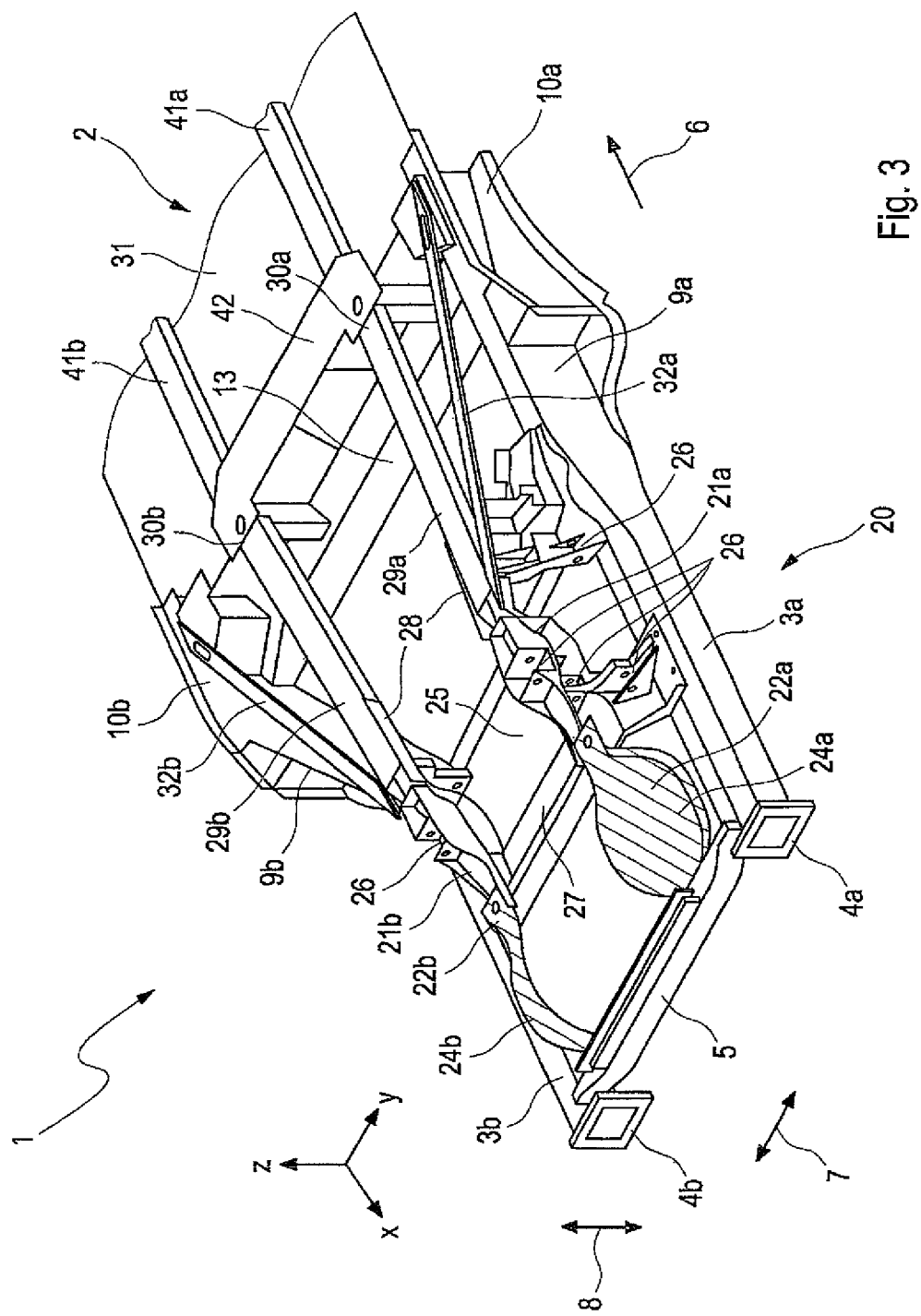
FIG. 3: a perspective bottom view of a second embodiment according to FIG. 2.

The exemplary embodiment according to FIGS. 2, 3 shows a variant of the invention in which the rear-end module 20 has a receiving device 40, for example for a gas bottle for supply of the internal combustion engine with gas. In such a case it is advantageous when the beam structures 22a, 22b are configured as shell-like carriers, which encase or tightly surround the mounting space for the gas bottle. Such a shell-like carrier can for example be a shell structure with a stiff design or a double-layered sheet metal, which is configured stiff in vehicle longitudinal direction. The remaining construction of the exemplary embodiment according to FIGS. 2 and 3 corresponds to the general design as explained with regard to the exemplary embodiment according to FIG. 1. The same reference numerals designate the same components of the embodiment. The features, which were described in connection with FIG. 1 can thus also be applied to the exemplary embodiments according to FIGS. 2, 3, 4, 5.

In addition to the embodiment according to FIG. 1, FIG. 3, which is a bottom view< shows that the second beam structures 29a, 29b with their front ends 30a, 30b are detachably fastened to the vehicle body 2 in the underbody region of the floor structure 31 in vehicle longitudinal direction 6 or the riving direction 6 along the underbody extending beam structures 41a, 41b (so-called floor longitudinal members) adjoining. If needed a preferably detachably fastened additional cross member 42 can be easily be provided, which is arranged so as to bridge fastening sites of the second beam structure 29a, 29b in the region of the floor structure 31 in vehicle transverse direction 7 and stiffens the same and also contributes in particular to stiffening of a vehicle body tunnel that is usually arranged at this location.

Figure 4:
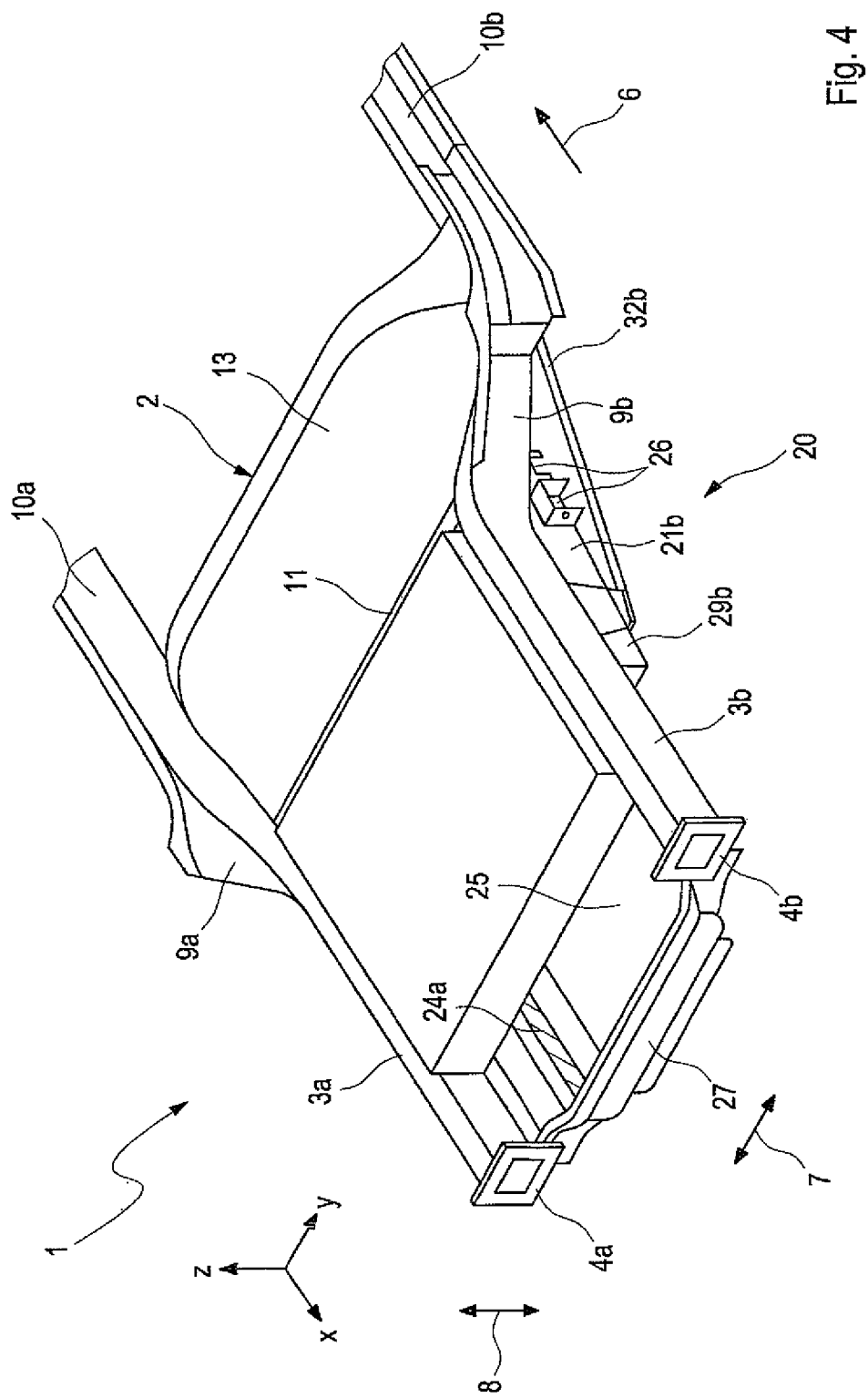
FIG. 4: a perspective top view onto a third embodiment of a rear-body structure of the vehicle according to the invention including a third embodiment of the rear-end module according to the invention in the assembled state.
Figure 5:
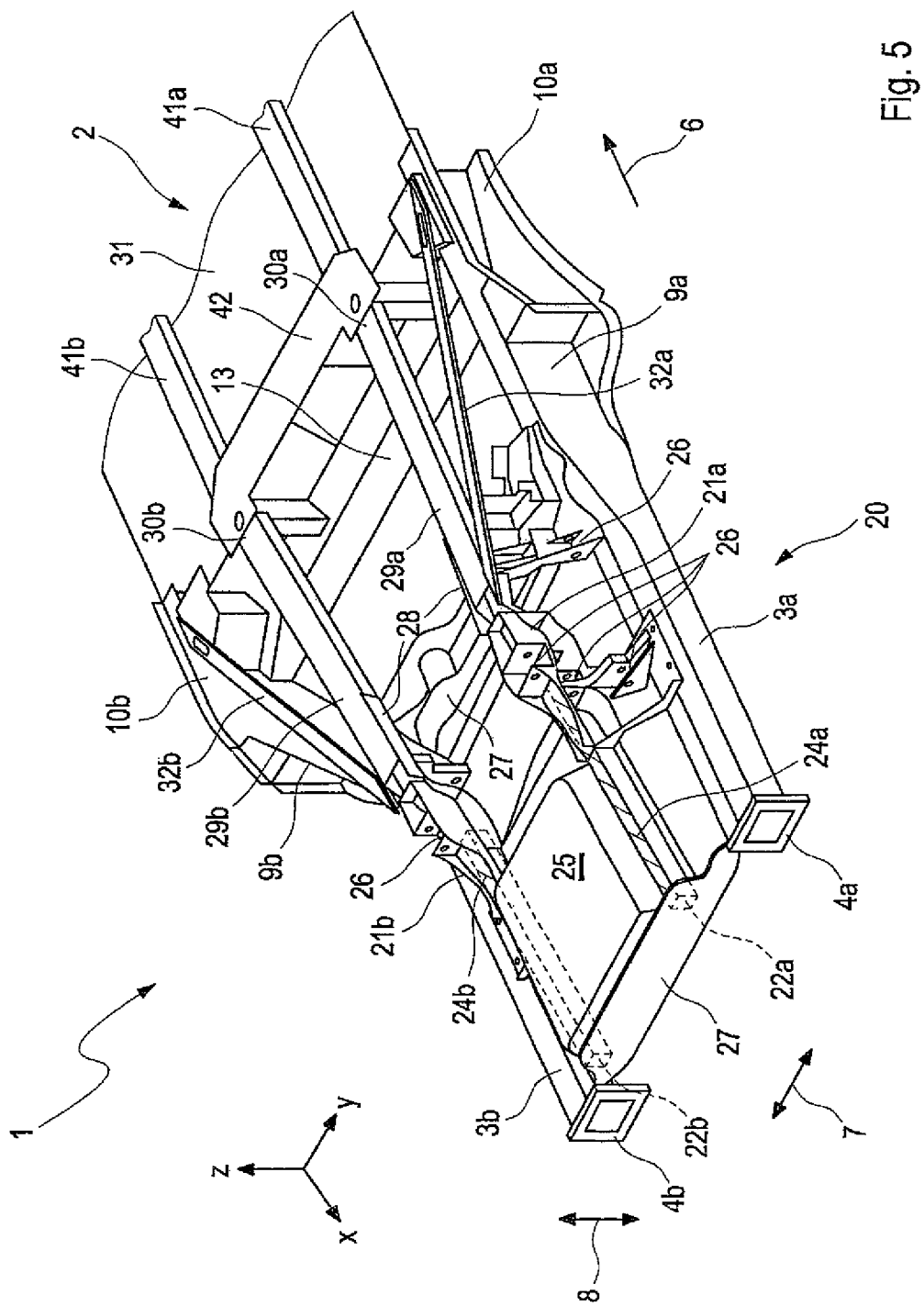
FIG. 5: a perspective bottom view of a third embodiment according to FIG. 4.

In a further exemplary embodiment according to FIGS. 4 and 5 the floor segment 25 is configured as spare wheel recess and is closed by a module carrier 27 on the rear side. Between the longitudinal members 3a, 3b of the body-in-white a placeholder for various additional aggregates for example pumps, filters, accumulators or the like is shown schematically which are already preassembled with the rear vehicle module 20 and can be connected in one assembly step with the body-in-white.

LIST OF REFERENCE NUMERALS 1. motor vehicle
2. vehicle body
3a, 3b longitudinal member
4a, 4b rear side end
5 rear transverse member
6 arrow
7 double arrow
8 double arrow
9a, 9b, transition member
10a, 10b sill
11 cross member
13 tank floor
14 opening
20 rear-end module
21a, 21b support structure
22a, 22b beam structure
23a, 23b end
24a, 24b hatching
25 trough shaped floor segment
26 receptacle
27 module carrier
28 further receptacle
29a, 29b second beam structure
30 front end
31 floor structure

What is claimed is:

1. A motor vehicle, comprising:
a vehicle body having at least two rear longitudinal members, which each form at least one primary load path for collision forces;
a rear-end module pre-assembled as a sub-assembly group, and which after completion of the body-in-white is connectable with the vehicle body during assembly of the vehicle, said rear-end module having on each side of the motor vehicle at least one support structure for fastening chassis components of a rear wheel suspension, and a first beam structure extending from the at least one support structure toward a rear of the motor vehicle for absorbing collision forces, wherein the support structure and the first beam structure together form at least one secondary load path for collision forces; and
a second beam structure extending in driving direction frontward and having a front end region connected with a floor structure of a passenger compartment of the vehicle body, said support structure being detachably connectable with the second beam structure so as to extend the at least one secondary load path into the floor structure.

2. The motor vehicle of claim 1, wherein the at least one support structure and the at least one first beam structure are connected to each other in transverse direction of the motor vehicle by at least one module carrier.

3. The motor vehicle of claim 1, wherein the rear-end module includes a trough-shaped floor structure adapted for receiving aggregates selected from the group consisting of a gas tank, batteries, accumulators, reserve wheel, control devices and equipment defining a vehicle variant.

4. The motor vehicle of claim 1, wherein the first beam structure is configured as a box-shaped or tubular carrier in the manner of a longitudinal member.

5. The motor vehicle of claim 1, wherein the beam structure is configured as a shell-shaped carrier.

6. The motor vehicle of claim 5, wherein the beam structure is adapted to receive a gas bottle so as to embrace the gas bottle.

7. The motor vehicle of claim 1, wherein the support structure has mounts for fastening chassis components.

8. The motor vehicle of claim 1, wherein the chassis components include a member selected from the group consisting of chassis control arms, stabilizers, tie rods, spring elements, damper elements, steering actuator, active systems for roll suppression and level regulation.

9. The motor vehicle of claim 1, wherein the at least one support structure is configured as extruded part, in particular made of aluminum or an aluminum alloy.

10. The motor vehicle of claim 1, wherein at least a portion of the rear-end module is non-detachably connected with the vehicle body.

11. The motor vehicle of claim 1, wherein the rear-end module is connected to the vehicle body by gluing.

12. The motor vehicle of claim 1, wherein the rear-end module has devices for fastening a rear axle drive.

13. The motor vehicle of claim 1, wherein the at least one secondary load path when viewed in vehicle transverse direction is arranged between the longitudinal members of the vehicle body.

14. The motor vehicle of claim 1, wherein the first beam structure, when viewed in vertical direction of the vehicle is arranged below the longitudinal member or is offset downward at least relative to the longitudinal member.

15. The motor vehicle of claim 1, wherein the at least one support structure is connected with a component of the primary load path by means of at least one of tensile struts and compression struts.

16. The motor vehicle of claim 4, wherein the component of the primary load path to which the at least one support structure is connected includes at least one of the longitudinal member and a side sill of the vehicle body.

17. The motor vehicle of claim 1, wherein the rear-end module is rigidly connected with the vehicle body.

18. A rear-end module for a vehicle body of a motor vehicle, said motor vehicle having at least two rear longitudinal members, which each form at least one primary load path for collision forces, said rear end module comprising:
a support structure for fastening chassis components of a rear wheel suspension, with one said support structure provided for each side of the motor vehicle; and
a beam structure which in an installed state of the rear-end module in the vehicle body extends from the support structure toward a rear of the motor vehicle for absorbing collision forces, wherein the support structure and the beam structure in the installed state form at least one secondary load path on each side of the motor vehicle for absorbing and/or transmitting collision forces, said support structure being detachably connectable with a second beam structure which extends frontward in driving direction and has an end region which is connectable with a floor structure of a passenger compartment of the vehicle body, so as to extend the at least one secondary load path into the floor structure.

19. The rear-end module of claim 18, wherein in the installed state of the rear-end module the at least one secondary load path is arranged between the longitudinal members of the vehicle body when viewed in transverse direction of the motor vehicle.

20. The rear-end module of claim 18, wherein in the installed state of the rear-end module the at least one secondary load path, in particular the beam structure, is arranged below the longitudinal member when viewed in a vertical direction of the motor vehicle or is at offset downward least relative to the longitudinal member.

21. The rear-end module of claim 18, wherein in the installed state of the rear-end module the support structure is connectable with components of the primary load path, in particular the longitudinal member or a side sill of the vehicle body by means of tensile struts and/or compression struts.

22. The rear-end module of claim 18, wherein in the installed state of the rear-end module, the rear-end module is rigidly connectable with the vehicle body.

23. The rear-end module of claim 18, wherein the at least one support structure and the at least one first beam structure are connected to each other in transverse direction of the vehicle by at least one module carrier.

24. The rear-end module of claim 18, further comprising a trough-shaped floor structure adapted for receiving aggregates selected from the group consisting of a gas tank, batteries, accumulators, reserve wheel, control devices and equipment defining a vehicle variant.

25. The rear-end module of claim 18, wherein the first beam structure is configured as a box-shaped or tubular carrier in the manner of a longitudinal member.

26. The rear-end module of claim 18, wherein the beam structure is configured as a shell-shaped carrier.

27. The motor vehicle of claim 26, wherein the beam structure is adapted to receive a gas bottle so as to embrace the gas bottle.

28. The rear-end module of claim 18, wherein the support structure has mounts for fastening chassis components.

29. The rear-end module of claim 28, wherein the chassis components include a member selected from the group consisting of chassis control arms, stabilizers, tie rods, spring elements, damper elements, steering actuator, active systems for roll suppression and level regulation.

30. The rear-end module of claim 18, wherein the at least one support structure is configured as extruded part, in particular made of aluminum or an aluminum alloy.

31. The rear-end module of claim 18, further comprising devices for fastening a rear axle drive.

* * * * *

UNITED STATES PATENT AND TRADEMARK OFFICE
CERTIFICATE OF CORRECTION

PATENT NO. : 9,828,031 B2
APPLICATION NO. : 15/128033
DATED : November 28, 2017
INVENTOR(S) : Hans-Jürgen Langhoff et al.

It is certified that error appears in the above-identified patent and that said Letters Patent is hereby corrected as shown below:

On page 2, under FOREIGN PATENT DOCUMENTS:
Replace "DE 11 2012 216 807" with -- DE 10 2012 216 807 --.

Signed and Sealed this
Sixth Day of March, 2018

Andrei Iancu
*Director of the United States Patent and Trademark Office*